US009002955B2

(12) United States Patent
Ma et al.

(10) Patent No.: US 9,002,955 B2
(45) Date of Patent: Apr. 7, 2015

(54) CARRIER-GRADE PEER-TO-PEER (P2P) NETWORK, SYSTEM AND METHOD

(75) Inventors: Larry Shaoyan Ma, Allen, TX (US); Weiyong Zhu, Richardson, TX (US); Li Mo, Plano, TX (US)

(73) Assignees: ZTE Corporation, Shenzhen (CN); ZTE USA Inc., Richardson, TX (US)

( * ) Notice: Subject to any disclaimer, the term of this patent is extended or adjusted under 35 U.S.C. 154(b) by 662 days.

(21) Appl. No.: 12/989,511

(22) PCT Filed: Apr. 24, 2009

(86) PCT No.: PCT/US2009/041678
§ 371 (c)(1),
(2), (4) Date: Jan. 7, 2011

(87) PCT Pub. No.: WO2009/132280
PCT Pub. Date: Oct. 29, 2009

(65) Prior Publication Data
US 2011/0113480 A1 May 12, 2011

Related U.S. Application Data

(60) Provisional application No. 61/048,023, filed on Apr. 25, 2008.

(51) Int. Cl.
*G06F 15/16* (2006.01)
*G06F 9/50* (2006.01)
(Continued)

(52) U.S. Cl.
CPC .............. *G06F 9/5072* (2013.01); *H04L 12/14* (2013.01); *H04L 12/1403* (2013.01); *H04L 67/104* (2013.01); *H04L 67/1091* (2013.01); *H04L 67/1046* (2013.01); *G06F 2209/505* (2013.01)

(58) Field of Classification Search
USPC ......... 709/201, 202, 203, 204, 205, 206, 207, 709/225, 226, 227, 228, 229, 230, 231, 232, 709/233, 235, 236, 245, 246, 223, 224, 238, 709/249; 705/14, 30, 39; 370/230, 231, 370/235, 352, 401, 465, 466, 468, 470, 471, 370/472, 328, 395.1, 252, 259, 260, 407, 370/412, 228, 241, 329, 389, 392, 419, 214, 370/216, 218, 225, 237, 245, 254, 261, 262, 370/278, 281, 310, 310.2, 339, 351, 353, 370/390, 395.2, 395.21, 404, 410, 469, 370/485; 379/114.2, 142.04, 114.03, 379/114.17, 221.02; 455/432.1, 11.1, 133, 455/13.1, 16, 405, 411, 414.1, 414.2, 419, 455/422.1, 423, 433, 435.1, 435.2, 436, 455/439, 456.1, 524, 550.1, 67.11, 7, 9

See application file for complete search history.

(56) References Cited

U.S. PATENT DOCUMENTS 7,450,494 B2 * 11/2008 Koyuncuoglu et al. ....... 370/216
7,609,721 B2 * 10/2009 Rao et al. ...................... 370/470
(Continued)

FOREIGN PATENT DOCUMENTS

WO WO-2007143900 A1 12/2007

*Primary Examiner* — Saket K Daftuar
(74) *Attorney, Agent, or Firm* — Drinker Biddle & Reath LLP

(57) ABSTRACT

A computing network, including: a plurality of peer computing devices including code, which when executed by a peer computing device causes the executing peer computing device to cooperate with at least one other of the peer computing devices; at least one server including code, which when executed by the at least one server locates at least one of the peer computing devices; and at least one mediator including code, which when executed by the at least on mediator collects charging information from at least some of the peer computing devices; wherein, the peer computing devices, at least one sever and at least one mediator are communicatively coupled via an at least carrier-grade telecommunications network being suitable for enhancing cooperation among the cooperating ones of the peer computing devices relative to best-efforts communications among the cooperating ones of the peer computing devices.

15 Claims, 3 Drawing Sheets

(51) Int. Cl.
*H04L 12/14* (2006.01)
*H04L 29/08* (2006.01)

(56) References Cited

U.S. PATENT DOCUMENTS

| | | | |
|---|---|---|---|
| 7,613,155 B2 * | 11/2009 | Shim ............................ | 370/338 |
| 7,724,657 B2 * | 5/2010 | Rao et al. ...................... | 370/229 |
| 7,808,906 B2 * | 10/2010 | Rao et al. ...................... | 370/235 |
| 7,869,803 B2 * | 1/2011 | Corson et al. ................. | 455/433 |
| 8,046,830 B2 * | 10/2011 | Rao et al. ...................... | 726/14 |
| 8,126,722 B2 * | 2/2012 | Robb et al. .................... | 705/1.1 |
| 2002/0133328 A1 | 9/2002 | Bowman-Amuah | |
| 2004/0053629 A1 * | 3/2004 | Rueger et al. ................. | 455/466 |
| 2004/0196826 A1 * | 10/2004 | Bao et al. ...................... | 370/352 |
| 2005/0226216 A1 | 10/2005 | Oyama et al. | |
| 2005/0266835 A1 * | 12/2005 | Agrawal et al. ............. | 455/414.3 |
| 2006/0039354 A1 * | 2/2006 | Rao et al. ...................... | 370/352 |
| 2006/0039355 A1 * | 2/2006 | Rao et al. ...................... | 370/352 |
| 2006/0039356 A1 * | 2/2006 | Rao et al. ...................... | 370/352 |
| 2006/0050631 A1 * | 3/2006 | Koyuncuoglu et al. ....... | 370/217 |
| 2006/0165060 A1 | 7/2006 | Dua | |
| 2006/0239252 A1 * | 10/2006 | Kantak et al. ................. | 370/352 |
| 2007/0087727 A1 | 4/2007 | Tseitlin et al. | |
| 2007/0121598 A1 | 5/2007 | McGary | |
| 2007/0123215 A1 * | 5/2007 | Wang et al. ................... | 455/411 |
| 2007/0147388 A1 * | 6/2007 | Kim et al. ................. | 370/395.21 |
| 2007/0154016 A1 * | 7/2007 | Nakhjiri et al. ............... | 380/270 |
| 2007/0206568 A1 * | 9/2007 | Silver et al. ................... | 370/352 |
| 2007/0288593 A1 | 12/2007 | Wang | |
| 2007/0298788 A1 * | 12/2007 | Corson et al. ................. | 455/433 |
| 2008/0049648 A1 | 2/2008 | Liu et al. | |
| 2008/0208925 A1 * | 8/2008 | Shum ............................ | 707/202 |
| 2008/0235770 A1 * | 9/2008 | Miao ................................ | 726/4 |
| 2008/0275813 A1 * | 11/2008 | Altberg et al. ................. | 705/39 |
| 2009/0070205 A1 * | 3/2009 | Altberg et al. ................. | 705/14 |
| 2010/0005288 A1 * | 1/2010 | Rao et al. ...................... | 713/151 |

* cited by examiner

CARRIER-GRADE PEER-TO-PEER (P2P) NETWORK, SYSTEM AND METHOD

CROSS-REFERENCE TO RELATED APPLICATIONS

This application is a national stage application, under 35 U.S.C. §371, of PCT/US2009/041678, filed Apr. 24, 2009, which claims priority of U.S. Provisional Application No. 61/048,023, filed Apr. 25, 2008.

FIELD OF THE INVENTION

The present invention relates generally to networking, and more particularly to carrier-grade Peer-to-Peer (P2P) networking.

BACKGROUND OF THE INVENTION

A fundamental principle behind Peer-to-Peer (P2P) network architectures is that application server functions offered by the network are typically implemented by a large number of distributed and autonomous network nodes and end nodes called peers, which collaborate with each other to accomplish the designated tasks. In a P2P-based network architecture, each peer typically provides server-like functionality and services as well as being a client within the system. In this way, the services or resources that would be provided by a centralized entity are instead available from the peers of the system. Such an arrangement is in contrast with a traditional client-server architecture (e.g., a public switched telephone network (PSTN) or IP multimedia subsystem (IMS)), in which a large number of clients communicate only with a small number of centralized, tightly managed servers responsible for performing designated tasks.

P2P applications have posed an increasing challenge for telecommunications operators for some time; at least in that P2P applications may generate tremendous amounts of traffic in the telecommunications network, resulting in network management problems and increasing both capital and operating expenditures; and that revenue loss is caused by some P2P applications, such as free or nearly-free Internet voice services offered by P2P operators. Indeed, P2P traffic may account for 50 to 90 percent of the total Internet traffic. Accordingly, viral P2P applications may cause significant revenue loss for telecommunications operators, but demand both capital and operating expenditure increases to meet the bandwidth and capacity needs.

Further yet, the use of so-called web 2.0 applications is increasing. Yet, telecommunications operators have largely not reaped significant benefits from these applications. This may be because current telecommunications network architectures are not suitable for Internet applications in general, and P2P applications in particular.

Telecommunications network operators have typically either discriminated against P2P applications, such as by blocking or delaying P2P traffic, or have not addressed the problem. Another solution is desired.

SUMMARY OF THE INVENTION

A computing network, including: a plurality of peer computing devices including code, which when executed by a peer computing device causes the executing peer computing device to cooperate with at least one other of the peer computing devices; at least one server including code, which when executed by the at least one server locates at least one of the peer computing devices; and at least one mediator including code, which when executed by the at least one mediator collects charging information from at least some of the peer computing devices; wherein, the peer computing devices, at least one server and at least one mediator are communicatively coupled via an at least carrier-grade telecommunications network being suitable for enhancing cooperation among the cooperating ones of the peer computing devices relative to best-efforts communications among the cooperating ones of the peer computing devices.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts, and in which.

DETAILED DESCRIPTION OF THE PREFERRED EMBODIMENTS OF THE INVENTION

It is to be understood the figures and descriptions of the preferred embodiments of the present invention have been simplified to illustrate elements that are relevant for a clear understanding of the present invention, while eliminating, for purposes of clarity, many other elements found in typical networking and P2P networks, systems and methods. Because such elements are well known in the art, and because they do not facilitate a better understanding of the present invention, a discussion of such elements is not provided herein.

Figure 1:
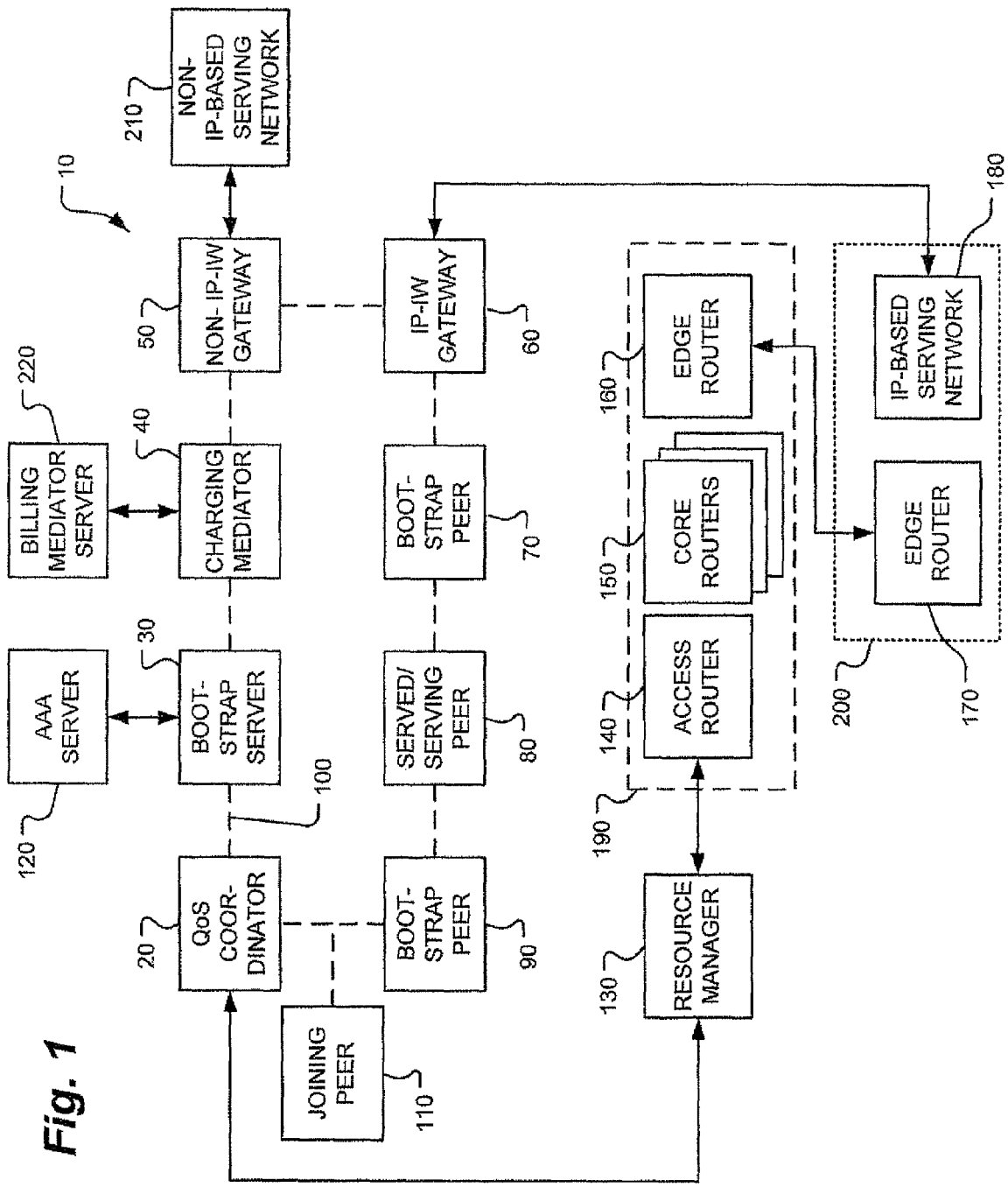
FIG. 1 illustrates a diagrammatic view of a carrier-grade peer-to-peer (P2P) network according to an embodiment of the present invention.

FIG. 1 illustrates a diagrammatic view of a carrier-grade peer-to-peer (P2P) telecommunications network 10 according to an embodiment of the present invention. For non-limiting purposes of explanation, a carrier-grade network generally satisfies "carrier-grade" or "carrier class" requirements indicative of a very high level of reliability. Carrier-grade networks may typically meet or exceed "five nines" availability standards, and provide very fast fault recovery through redundancy (such as on the order of less than 50 milliseconds). This is in contrast to best-efforts-type communications networks, such as the Internet, where individual links or legs may have analogous service, but end-to-end communications are typically not so ensured.

By way of further non-limiting explanation, a telecommunications network is generally a network of telecommunications links and nodes arranged so that messages may be passed from one part of the network to another over multiple links and/or through various nodes. Telecommunications network elements are not typically utilized in traditional P2P networks. Instead, traditional P2P networks are generally distributed networks in an ad-hoc format to provide the best-effort services.

According to certain embodiments of the present invention, peer nodes are introduced into a network following at least carrier-grade telecommunications network practices to ensure quality of services (carrier-grade) are offered by utilizing these, such as pre-existing telecom network elements. Typical telecommunications elements of existing telecommunications networks that may be used may include Authorization, Authentication and Accounting (AAA) servers, charging gateways and resource management platforms. According to certain embodiments of the present invention, an underlying carrier-grade telecommunications network may be utilized to provide P2P network services may support best-efforts grade communications across carrier-grade links, but not include best efforts type links itself. According to certain embodiments of the present invention, best-efforts—type or grade and carrier-grade P2P services may be provided in a common network.

Referring still to FIG. 1, in the illustrated embodiment network 10 generally includes: a quality of service (QoS) coordinator 20, a boot-strap server 30, a charging mediator 40, a non-Internet Protocol (IP) interworking (WV) gateway 50, an IP-IW gateway 60, a boot-strap peer 70, a served- and/or serving peer 80, another boot-strap peer 90, a communications medium 100, and a joining peer 110. An authorization, authentication and online accounting (AAA) server 120, resource manager 130 and billing mediation system 220 are communicatively coupled to the network 10. In the illustrated embodiment, network 10 is also communicatively coupled with an IP backbone 190, which includes access router 140, core router(s) 150, and edge router 160. In the illustrated embodiment, IP backbone 190 is communicatively coupled with another IP backbone 200, which includes edge router 170 and an IP-based serving network 180. In the illustrated embodiment, IP-based serving network 180 is additionally communicatively coupled to IP-IW gateway 60. Finally, in the illustrated embodiment, non-IP-IW gateway 50 is communicatively coupled to a non-IP-based serving network 210. It will be apparent to those skilled in the art that modifications and variations to the particular elements included, and/or the combination and/or configuration and/or number of the elements provided may be made without departing from the spirit or scope of the present invention.

By way of further non-limiting explanation, in certain embodiments of the present invention, one or more of the elements provided may take the form of computing devices. "Computing device", as used herein, refers to a general purpose computing device that includes a processor. A processor generally includes a Central Processing Unit (CPU), such as a microprocessor. A CPU generally includes an arithmetic logic unit (ALU), which performs arithmetic and logical operations, and a control unit, which extracts instructions (e.g., code) from a computer readable medium, such as a memory, and decodes and executes them, calling on the ALU when necessary. "Memory", as used herein, generally refers to one or more devices or media capable of storing data, such as in the form of chips or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may take the form of one or more solid-state, optical or magnetic-based drives, by way of further non-limiting example only. Memory may be internal or external to an integrated unit including the processor. Memory may be internal or external to a computing device. Memory may store a computer program, e.g., code or a sequence of instructions being operable by the processor. In certain embodiments of the present invention, one or more of the elements provided may take the form of code being executed using one or more computing devices, such as in the form of computer device executable programs or applications being stored in memory.

"Server", as used herein, generally refers to a computing device communicatively coupled to a network, which manages network resources. A server may refer to a discrete computing device, or may refer to an application that is managing resources rather than an entire computing device. "Network", as used herein, generally refers to a group of two or more computing devices communicatively connected to one-another. "Internet", as used herein, generally refers to the global interconnection of computing devices, and computing device networks, commonly referred to as such.

Referring still to FIG. 1, quality of service (QoS) coordinator 20 generally serves to check and deliver QoS requests to access a network, such as IP backbone 190. Coordinator 20 may take the form of an application function (AF) defined in a Resource and Admission Control Sub-System (RACS) or a policy and charging control (PCC) system. Coordinator 20 may report QoS service charging information to a billing system, such as billing mediator server 220 via charging mediator 40. Resource manager 130 may execute and report the results of the responses to requests of QoS Coordinator 20 and request instructions from QoS Coordinator 20. It may also acquire the underlying IP traffic types by utilizing suitable techniques, such as Deep Packet Inspection (DPI) and take suitable actions, such as blocking or allowing certain IP traffic flows.

Boot-strap server 30 may take the form of a server used by a peer computing device (hereinafter referred to as a "peer") to locate a P2P bootstrap peer and/or to join the P2P network. Bootstrap server 30 may take the form of a stable host with a domain name service (DNS) name. Bootstrap server 30 may be configured to be able to select itself as a bootstrap peer for the purpose of admission efficiency, if it has spare processing capacity, for example.

Charging mediator 40 may collect charging information from P2P peers and deliver billing data to a billing system, such as billing mediator server 220. Charging mediator 40 may be P2P-aware. Charging mediator 40 may be stateless. Charging mediator 40 may take the form of an off-line charge platform, such as a sub-system that provides 3rd Generation Partnership Project (3GPP) charging gateway function (CGF) and/or charging data function (CDF) functionality.

Non-Internet Protocol (IP) interworking (IW) gateway 50 may perform interworking with other non-IP service networks. Gateway 50 may be a P2P-aware gateway. IP-IW gateway 60 may perform interworking with other P2P networks or IP-based service networks, Gateway 60 may take the form of a P2P-aware gateway. In certain embodiments of the present invention, gateway functionality may be integrated into P2P peers, for example.

Bootstrap peers 70, 90 may assist a joining peer, such as joining peer 110, to join the P2P network. Bootstrap peers may integrate the functions of an admitting peer, such as that proposed for P2P Session Initiation Protocol (P2PSIP) applications, for example. Such an approach may simplify overall network architecture, for example.

The P2P network to be overlaid on a carrier-grade telecommunications network may utilize peer nodes that simultaneously function as both "clients" and "servers" to the other peer nodes on the network. In certain embodiments of the present invention, served/serving peer 80 and/or joining peer 110 may be such a node. As will be understood by those possessing an ordinary skill in the pertinent arts, this model of network arrangement differs from the client-server model, where communication is usually to and from a central server. In certain embodiments of the present invention, a client-server structure may be used for some tasks (e.g., searching, authorization) and a P2P structure for others (e.g., applications).

Communications medium 100 may take the form of a data communications network communicatively coupling elements to one-another. In the illustrated embodiment of FIG. 1, medium 100 communicatively couples quality of service (QoS) coordinator 20, boot-strap server 30, charging mediator 40, non-Internet Protocol (IP) interworking (IW) gateway 50, IP-IW gateway 60, boot-strap peer 70, served- and/or serving peer 80, boot-strap peer 90 and joining peer 110 to one-another. In certain embodiments of the present invention, medium 100 may take the form of a carrier-grade telecommunications network. In certain embodiments of the present invention, such a network may include wired and/or wireless communications links or legs. In certain embodiments of the present invention, such a network may include public and/or private communications links or legs.

Authorization, authentication and online accounting (AAA) server 120 may perform user authentication, authorization and online accounting in an analogous manner as is performed in conventional carrier-grade telecommunications networks.

IP backbones 190, 200 may take the form of the major network connections of an IP network, such as an IP network communicatively coupled to and/or part of the Internet. Access router 140 may serve to control access traffic for IP backbone 190. Access router 190 may perform QoS enforcement responsively to QoS coordinator 20 and resource manager 130. Core router(s) 150 may serve to perform IP packet routing for IP backbone 190. Edge routers 160, 170 may serve to perform interworking as security gateways with other IP networks. Edge routers 160, 170 may take the form of IP layer elements without P2P awareness.

In the illustrated embodiment, IP-based serving network 180 is communicatively coupled with IP-IW gateway 60. IP serving network 180 may take the form of an IP based network that provides next generation network (NGN), IMS and/or P2P services, for example (e.g., acts as a data source and/or sink for peer 80 applications).

In the illustrated embodiment, non-IP-IW gateway 50 is communicatively coupled with a non-IP-based serving network 210. Non-IP—based serving network 180 may take the form of a non-IP-based network that provides services, for example (e.g., acts as a data source or sink for P2P applications), such as a public switched telephone network (PSTN) or Public Land Mobile Network (PLMN).

Billing mediator server 220 may process billing and/or payment information, and may take the form of a conventional carrier-grade telecommunications network billing system, for example.

Referring still to FIG. 1, such an approach may advantageously leverage advantages of both carrier-grade telecommunications and P2P network architectures. Such an approach may enable carrier-grade telecommunications operators to capture P2P application revenues without losing current telecommunications revenues. Such an approach may advantageously provide carrier-grade P2P services in an IP based network with limited impact to the telecommunications network architecture and services. Session control functionalities and many, if not most of the service applications may be distributed among the peer nodes. In certain embodiments of the present invention, only certain network elements, such as those that provide authentication, QoS control, accounting and service provisioning, which may be critical to network operation, are kept in the carrier side of network.

Some benefits of such an architecture or approach may include: requiring minimal dedicated network elements while providing great scalability; providing unified customer data management with global reach-ability; providing virtual home environments for customers to enjoy same service experiences from multiple locations; providing a secured communication environment with a trusted network operator; providing Quality of Services (QoS) as a service to end-users; and providing access technology with an agnostic minimal impact to an IP based bearer network.

In certain embodiments of the present invention, certain ones of the provided network elements may be owned and/or operated by a carrier-grade telecommunications network operator. For example, in certain embodiments of the present invention QoS coordinator 20, boot-strap server 30, charging mediator 40, gateways 50, 60, AAA server 120, resource manager 130 and billing mediator server 220 may be owned and/or operated by a carrier-grade telecommunications network operator. In certain embodiments of the present invention, certain ones of the provided network elements may not be owned and/or operated by a carrier-grade telecommunications network operator. For example, in certain embodiments of the present invention boot-strap peers 70, 90 and served/serving peer 80 may not be owned and/or operated by a carrier-grade telecommunications network operator. In such an approach, the P2P network may generally take the form of an overlay network that provides P2P applications utilizing underlying IP network elements with minimal new equipment required.

Such an approach may provide for a number of additional advantages, such as clients being involved with charging. A charging function is conventionally based on the assumption that a terminal or client is not capable of providing charge information. In certain embodiments of the present invention however, peers (e.g., both served and serving peers) who are involved in a service provision, such as a "call" or other application session, may be required to provide certain information associated with the service or charge. This information may be provided to charging mediator 40 for validation, for example.

Such an approach may provide for QoS initiation by a client. QoS in conventional architectures is the responsibility of the network and may be traditionally preset by the operator or pre-subscribed to by users. In certain embodiments of the present invention, P2P application users can initiate QoS changes dynamically via a client user interface, such as a web page or application running on a user's computing device. Provided network equipment, such as Broadband Remote Access Servers (BRAS) and routers 140 and resource manager 130 and coordinator 20, may enforce QoS changes requested by the users or their terminals or computing devices.

Such an approach may provide for user authorization and authentication to be performed using conventional carrier-grade telecommunications network AAA servers, which may already be present in a carrier-grade telecommunications network (e.g., 120). Such an approach may provide two benefits: first, it can leverage the AAA equipment or network solution without requiring a substantial new investment; and second, it may enable current network users to use the same credential information to access P2P services.

Such an approach may provide for nomadic support. Nomadic support may be provided in an analogous manner as conventional Internet access, such as by a user accessing the network using the Internet credential information he/she possesses. Such an approach may provide for mobility support using underlying telecommunications network wireless access technologies, for example.

As compared to conventional P2P and carrier-grade telecommunications services, such an approach may serve to deliver the best of both, i.e., to provide carrier-grade peer-to-peer services with a secure and trusted telecommunications environment. Such an architecture and approach extends a carrier-grade telecommunications operator's services to the Internet service arena and provides the operator a "tool" to compete with P2P operators and services.

Referring still to FIG. 1, peer admission of joining peer 110 to the P2P overlay network may be accomplished via coordination among bootstrap server 30, bootstrap peer 90 and joining peer 110, in a conventional manner, for example. A utilized approach may be in accordance with the IETF P2PSIP proposal in principal, for example.

In certain embodiments of the present invention, joining peer 110 may contact bootstrap server 30 to acquire contact information of a suitable bootstrap peer, e.g., boot strap peer 90. If joining peer 110 knows about a bootstrap peer, e.g., the last bootstrap peer it used, that bootstrap peer may be contacted first. Afterward, joining peer 110 works with an appropriate bootstrap peer, e.g., boot strap peer 90, to complete the joining process. During the joining process, joining peer 110, bootstrap server/peer 30/90 and the AAA server 120 may cooperate to validate the credential information of joining peer 110, as well as other information, such as the peer location and capabilities, for example. Other P2P network configuration information may be delivered after successful authentication, for example.

In certain embodiments of the present invention, peer authentication may be performed between joining peer 110 and AAA system 120 via bootstrap server 30. In certain embodiments of the present invention, the authentication must be mutual. After successful authentication, an authorized token signed by AAA system 120 may be passed to joining peer 110 and carried in a "JOIN" signaling to bootstrap peers (e.g., 70, 80, 90). Information sealed in the token may include, for example, a randomly assigned peer ID, a user ID mapped from the user name, service IDs that identifies what services joining peer node 110 is able to provide, an applicable offline or online charging model, QoS profiles, and timestamp information. Other information may be included in addition to or lieu of these information items. The information may be used by the P2P network to validate the identity claimed by the joining peer 110, the service group it belongs to and/or the QoS level it is authorized to use, for example.

Charge processing is conventionally the responsibility of the network, because of underlying assumptions of legacy terminals in such network architectures. A P2P network is however based on the expectation that terminals are computing devices that can record information that can be used for charge and billing purposes, such as the type of service (e.g., voice, data or multimedia), the duration of services (e.g., including start and end timestamps), and the level of QoS for the service, for example. In certain embodiments of the present invention, charging information can not typically rely only upon the service information provided by a sole peer, such as a served peer.

In certain embodiments of the present invention, offline charging may be provided. In certain embodiments of the present invention, for offline charging, both serving peers and served peers may be involved in providing charging information to charging mediator 40, which then validates and consolidates the information for billing purposes (and forwards appropriate information to billing mediator server 220, for example).

In certain embodiments of the present invention, online charging may be provided. In certain embodiments of the present invention, for online charging, serving peers (e.g., 80) may require served peers (e.g., 80) to pass certain credits in order to access services, collecting credit units from the served peer. An online charging system may issue credit units to served peers, and collect and validate issued credit units from serving peers. In certain embodiments of the present invention, bootstrap server 30 and/or charging mediator 40 may serve as a proxy for such an online charging system, and adapt P2P charging signaling to conventional carrier-grade telecommunications system charging signaling, and vice-a-versa.

Figure 2:
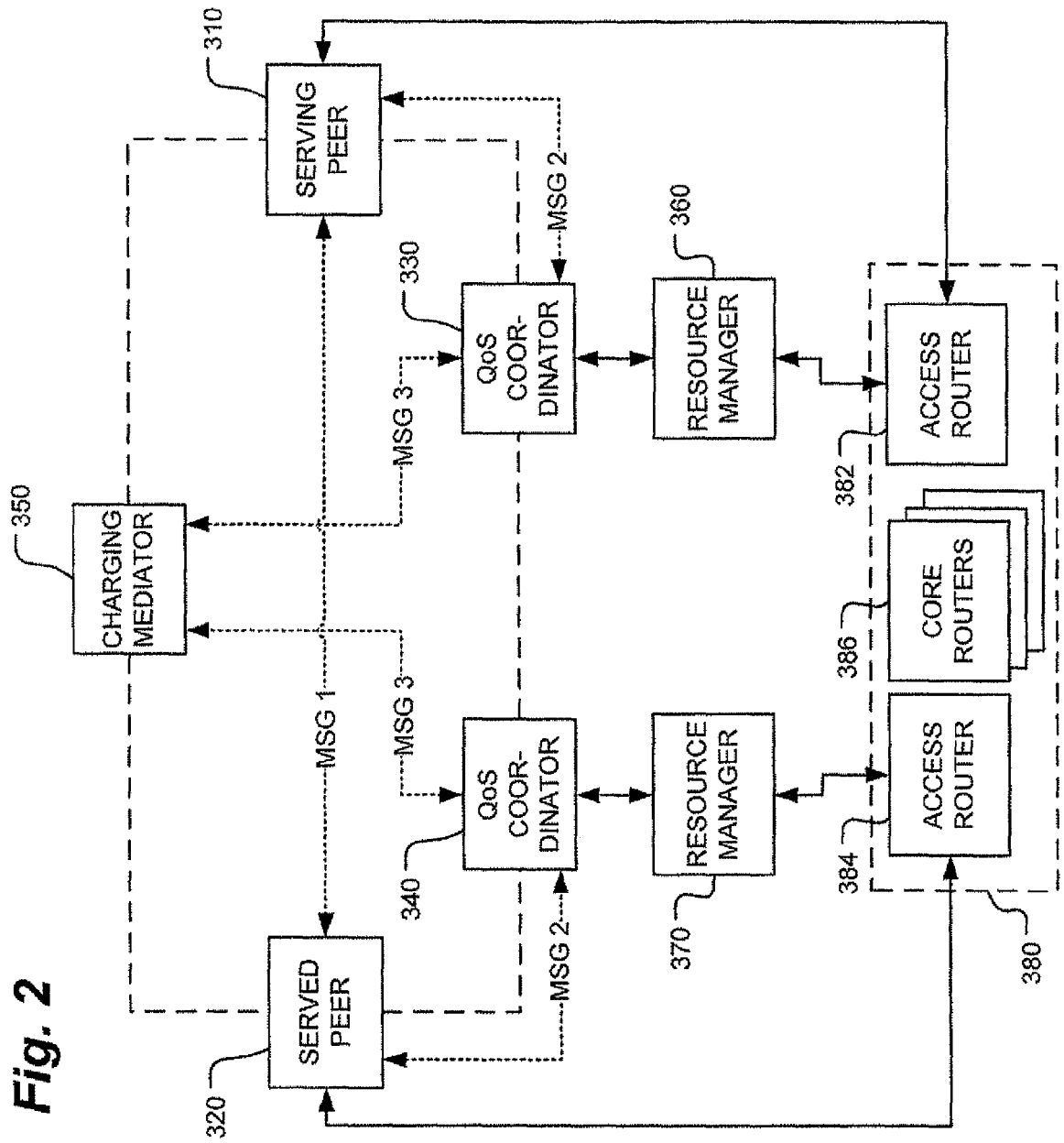
FIG. 2 illustrates a diagrammatic view of select messaging corresponding to a dynamic QoS process according to an embodiment of the present invention.

In certain embodiments of the present invention, a subscriber or user may modify the QoS for either traffic originating and/or terminating on the subscriber's or user's device for any particular session. Referring now to FIG. 2, there is shown a diagrammatic view of select messaging corresponding to a dynamic QoS process according to an embodiment of the present invention. The embodiment of FIG. 2 includes a serving peer 310, which may be akin to peer 80 (FIG. 1); a served peer 320, which may be akin to peer 80 (FIG. 1); first and second QoS coordinators 330, 340, which each may be akin to QoS coordinator 20 (FIG. 1); a charging mediator 350, which may be akin to charging mediator 40 (FIG. 1); first and second resource managers 360, 370, which each may be akin to resource manager 130 (FIG. 1); and IP backbone 380, which may be akin to IP backbone 190 or 200 (FIG. 1). IP backbone 380 includes first and second access routers 382, 384, which each may be akin to access router 140 (FIG. 1), and core router(s) 386, which may be akin to core router(s) 150 (FIG. 1).

If the user of served peer 320 intends to have better quality of services than the default, or that which is then being provided, for example, he/she may request such a change with serving peer 310 by exchanging messaging 1, such as to determine whether the improvement is supported. If so, served peer 320 and serving peer 310 may send a request via the client interface to the appropriate QoS coordinator 330, 340 by exchanging messaging 2. The charge function of the client may advise the user of a new-to-apply charging policy for the better service. If the customer agrees upon the charge policy, the terminal sends a better QoS marking for following traffic. Resource managers 360, 370, which may take the form of a RACS or PCRF system, and routers 382, 384 can enforce the new QoS marking and the QoS for services will then be improved. In certain embodiments of the present invention, QoS coordinators 330, 340 may exchange authorization/notification messages with charging mediator 350 (messaging 3), either to request approval of the change, and/or to notify mediator 350 of the change.

In certain embodiments of the present invention, a 3rd Generation Partnership Project (3GPP) policy, charging and control (PCC) architecture may be used in the access network to provide a charging function. Such a configuration may provide for a corresponding AF to handle QoS requirements from P2P serving peers, and QoS as a special service can be charged.

Figure 3:
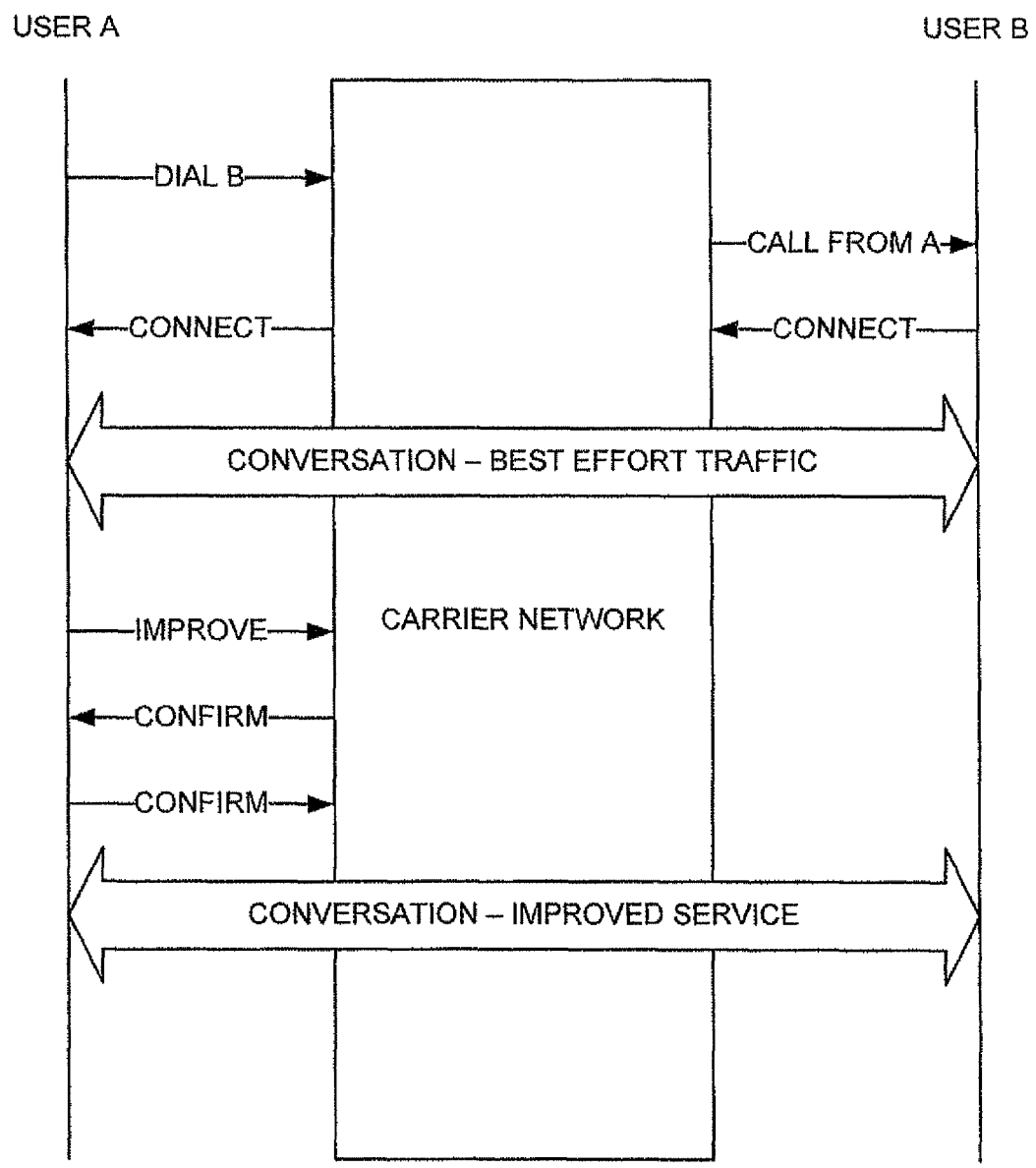
FIG. 3 illustrates a diagrammatic view of select messaging corresponding to a dynamic QoS process according to an embodiment of the present invention.

Referring now to FIG. 3, there is also shown a diagrammatic view of select messaging corresponding to a dynamic QoS process according to an embodiment of the present invention. FIG. 3 shows a high-level message flow diagram of an embodiment of a dynamic class of service (CoS) process in P2P-based network. A P2P-based next generation network provides dynamic class of service (CoS) capability with monetary repercussions. For example, the caller or the called party can dynamically adjust the differentiated services code point (DSCP), which has higher (or lower) fees associated with the connection. A user can initiate the request, which is then enforced on the network side in order to prevent CoS theft.

In certain embodiments of the present invention, a subscriber may have an ability to modify the CoS for both the traffic originating and terminating on the subscriber for any particular session. If the user intends to have better services, he or she requests better service. The network in turn advises the user of the new charging policy for the better service. Alternatively, the user's computing device may have the cost data to respond to the user's request for higher CoS directly. If the customer agrees upon the better CoS costs, the service quality (CoS) provided to the customer is improved. The user's computing device may collect data associated with the upgrade in communication quality, such as session start time and stop time and the upgraded class, for example, for billing purposes. In order to support dynamic CoS, the subscriber or the user's computing device may establish a new session or communications with different billing marking. The network may snoop those messages (such as SIP messages), or proxy those messages, to modify the markings, in accordance with the operator's policy and charging model. Such an approach may be akin to that described in commonly assigned and copending U.S. patent application Ser. No. 12/062,404, published as United States Patent Application Publication No. 2009/0019156, the entire disclosure of which is hereby incorporated by reference as if being set forth in its entirety herein.

Referring again to FIG. 3, in the illustrated embodiment, user A elects to initiate a P2P network application cooperatively with user B by sending a DIAL B message to the carrier-grade network. The carrier-grade telecommunication network then informs user B of the requested cooperation via a CALL FROM A message. User B accepts the cooperation request by sending an ok to CONNECT message to the carrier-grade network, which then sends an analogous CONNECT message to user A. The requested cooperative session then proceeds, using a best efforts—type policy, for example. Downgrades may be achieved in an analogous manner.

If the user thereafter elects to improve to carrier-grade—type service, from the best-efforts—type service, it may communicate an IMPROVE message indicative of the desired improvement to the carrier-grade telecommunications network. Confirmation CONFIRM messages may then be exchanged between the electing user and the carrier-grade telecommunications network. Alternatively, confirmation may occur prior to the IMPROVE messaging using the user's device. The requested cooperative session then proceeds, using a carrier-grade—type policy for example.

Conventionally, a public switched telephone network (PSTN) or IP multimedia subsystem (IMS) network offers service via the so-called subscriber model. That is, a user subscribes to one or more services offered by the operator and the operator collects charges from the subscriber for the service it provides.

In addition to or lieu of such an approach, certain embodiments of the present invention may use a Service Broker Model (SBM) for P2P applications. In this model, a user can inject a request to the network for one or more certain services he/she wants. The network, acting as a broker, finds the service(s) (from other peers that offer the service(s)) requested within the network and deliver the service(s) to the user. The charging method for compensating the service provided by the network may be defined by the operator.

There can be several variations of the SBM. One is that the network informs the user of the contact information of the service providers. In this case, the network acts as a "yellow pages" of sorts. Operators may elect to provide such "yellow pages" in a static way or through a search engine service, for example. This model may be particularly well-suited for certain Internet applications, such as content sharing, and media (e.g., music or movie) downloading. Another model is that the operator itself acts as a proxy on behalf of service providers to provide services. This may be advantageous for certain telecommunications applications, such as audio/video calls, and/or audio/video conferences, for example.

Fundamentally different from the IMS service broker model (SCIM), where the services have to be offered by the operator via an Application Server (AS) and a user has to pre-subscribe the service in the home subscriber server (HSS), the user in either of these SBM models does not have to pre-subscribe to the services he or she is provided. With the service broker model, services can be added or removed with little involvement of the networking equipment. Many Internet services, such as advertisement, content sharing or distribution, work collaboration, music and video download, for example, can be offered by this approach. Service providers can be the same as the access network provider, the core network provider, or 3rd parties, such as peers. This gives carrier-grade telecommunications system operators great flexibilities to offer innovative services.

Telecommunications networks are migrating toward all IP based networks, which provide excellent opportunities for telecommunications and Internet convergence. Increasing interests in embedded voice, instant messaging (IM) functionalities within many online shopping sites and the integration of Internet Customer Relations Management (CRM) and logistic process with Voice over IP (VoIP) evidence such convergence. The convergence may be able to be implemented by P2P applications with much less effort than what can be done using traditional telecommunications approaches. Indeed, telecommunications operators are uniquely positioned to offer converged services, such as carrier-grade P2P services. They have brand names trusted by customers; they can easily bundle the P2P services with more conventional telecommunications services; and, they can unify the authentication for both telecommunications and P2P services. Besides reclaiming revenues lost to P2P competitors, offering P2P services is also a good starting point for an operator to leverage content delivery and advertising market shares.

The approach described herein is believed to be a practical way for carrier-grade telecommunications network operators to deploy P2P services with minimum investment, while continuing to serve its current telecommunications users. This approach also may lead toward greater convergence of telecommunications and P2P networks.

In certain embodiments of the present invention, a network architecture that combines P2P devices with existing IP network infrastructures to deliver P2P services and telecommunications services may be provided. P2P services and existing service may co-exist on the same IP network. Existing network elements can be shared by a P2P network. Peer authorization and authentication mechanisms may be performed jointly by a joining peer, a bootstrap server and the authorization and authentication (AA) server, such as AAA server. Digital secure tokens may be used to indicate authorization and authentication. Tokens may include randomly assigned peer ID, the user ID mapped from the user name, the service IDs that identify what services this joining peer node is able to provide, the service group the peer belongs to, offline or online charging model, QoS profiles, and timestamp, for example. Using offline and online charging, charging devices conforming to 3GPP, 3GPP2 and/or TISPAN standards may be used. A charging mediator may be used to convert P2P charging signaling to conventional charging signaling, and vice-a-versa. Bootstrap servers may serve as such mediators. To prevent charging fraud for P2P services, both serving peers and served peers may be involved in providing charging information to a charging mediator, which then validates and consolidates the information for charging and billing purpose. An online charging or credit mechanism for P2P services; where a serving peer requires the served peer to pass certain credits in order to access services, and collects credit units from the served peer, may be provided. An existing or new online charging system may issue credit units to the served peer, and collect and validate issued credit units from the serving peer.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:

1. A computing network, comprising:
a plurality of peer computing devices comprising code, which when executed by a peer computing device causes the executing peer computing device to cooperate with at least one other of the peer computing devices;
at least one server comprising code, which when executed by the at least one server locates at least one of the peer computing devices;
at least one mediator comprising code, which when executed by the at least one mediator collects charging information from at least some of the peer computing devices;
at least one IP interworking gateway communicatively coupled to at least one-other IP based network and comprising code, which when executed by the at least one IP interworking gateway causes the executing IP interworking gateway to cooperate with at least one of the peer computing devices;
wherein, the peer computing devices, at least one server and at least one mediator are communicatively coupled via an at least carrier-grade telecommunications network being suitable, based on a request from one of the cooperating ones of the peer computing devices via a client user interface, for (i) enhancing cooperation among the cooperating ones of the peer computing devices relative to best-efforts communications among the cooperating ones of the peer computing devices, and (ii) adjusting the charging information based on the cooperation enhancement; and
wherein the at least carrier-grade telecommunications network meets or exceeds five nines availability standards and provides fault recovery through redundancy less than 50 milliseconds
wherein, the IP interworking gateway is communicatively coupled via the at least carrier-grade telecommunications network to the peer computing devices
wherein the at least one mediator comprises code, which when executed by the at least one mediator collects charging information from the at least one of the cooperating ones of the peer computing devices,
wherein the at least one mediator delivers information indicative of the collected charging information to a billing system corresponding to the carrier-grade telecommunications network,
wherein the carrier-grade telecommunications network comprises wireless links between ones of the peer computing devices,
wherein the carrier-grade telecommunications network comprises an IP based network, and
wherein at least one of the cooperating ones of the peer computing devices comprises code, which when executed by the at least one cooperating peer computing device causes the at least one cooperating peer computing device to request a class of service change.

2. The network of claim 1, further comprising
a non-IP interworking gateway communicatively coupled to at least one-other non-IP based network and comprising code, which when executed by the at least one non-IP interworking gateway causes the executing non-IP interworking gateway to cooperate with at least one of the peer computing devices;
wherein, the non-IP interworking gateway is communicatively coupled via the at least carrier-grade telecommunications network to the peer computing devices.

3. The network of claim 1, further comprising a user authentication and authorization computing device communicatively coupled to the at least one charging mediator and comprising code, which when executed by the authentication and authorization computing device authorizes additional peer computing devices.

4. The network of claim 3, wherein the user authentication and authorization computing device is also an accounting computing device.

5. The network of claim 3, wherein the user authentication and authorization computing device provides a digital token, wherein at least some of the peer computing devices determine at least one of: what services at least one of the cooperating peer computing devices is able to provide, and the service group the at least one of the cooperating peer computing devices belongs to, responsively to receipt of the digital token.

6. The network of claim 1, wherein at least one of the cooperating ones of the peer computing devices comprises code, which when executed by the at least one cooperating peer computing device causes the at least one cooperating peer computing device to request a class of service change.

7. The network of claim 6, wherein for the requesting at least one cooperating peer computing device, the carrier-grade telecommunications network selectively provides best-efforts communications prior to the class of service change request, and carrier-grade communications after the class of service change request.

8. The network of claim 7, further comprising a quality of service coordinator communicatively coupled to the carrier-grade telecommunications network, and comprising code, which when executed by the at least one quality of service coordinator causes the at least one quality of service coordinator to cause the carrier-grade telecommunications network to selectively provides best-efforts communications prior to the class of service change request, and carrier-grade communications after the class of service change request.

9. The network of claim 1, wherein the at least one mediator code collected charging information is associated with service requests from ones of the cooperating peer computing devices.

10. The network of claim 1, wherein the at least one mediator code collected charging information is associated with services provided by ones of the cooperating peer computing devices.

11. A computer program product being tangibly embodied in at least one non-transitory computer-readable medium and comprising computing device executable code for use with an at least carrier-grade telecommunications network, wherein the at least carrier-grade telecommunications network meets or exceeds five nines availability standards and provides fault recovery through redundancy less than 50 milliseconds, said code comprising:

code for causing at least some of a plurality of peer computing devices to cooperate with one another over the at least carrier-grade telecommunications network to provide, based on a request from one of the cooperating ones of the peer computing devices via a client user interface, at least carrier-grade telecommunications network native peer-to-peer application support; and code for collecting charging information from at least some of the cooperating ones of the peer computing devices and providing data indicative of at least a portion of the collected charging information to a billing system associated with the at least carrier-grade telecommunications network, wherein the charging information is adjusted based on the cooperation of the peer computing devices over the at least carrier-grade telecommunications network, wherein the at least carrier-grade telecommunications network comprises at least one IP interworking gateway communicatively coupled to at least one-other IP based network and comprising code, which when executed by the at least one IP interworking gateway causes the executing IP interworking gateway to cooperate with at least one of the peer computing devices;

wherein, the IP interworking gateway is communicatively coupled via the at least carrier-grade telecommunications network to the peer computing devices wherein the at least one mediator comprises code, which when executed by the at least one mediator collects charging information from the at least one of the cooperating ones of the peer computing devices, wherein the at least one mediator delivers information indicative of the collected charging information to a billing system corresponding to the carrier-grade telecommunications network, wherein the carrier-grade telecommunications network comprises wireless links between ones of the peer computing devices, wherein the carrier-grade telecommunications network comprises an IP based network, and wherein at least one of the cooperating ones of the peer computing devices comprises code, which when executed by the at least one cooperating peer computing device causes the at least one cooperating peer computing device to request a class of service change.

12. The computer program product of claim 11, wherein the code further comprises code for receiving a quality of service change request from at least one of the cooperating peer computing devices, and modifying a class of service associated with the at least one of the cooperating peer computing devices responsively to the received request.

13. The computer program product of claim 11, wherein the code further comprises:

code for receiving a quality of service change request from at least one of the cooperating peer computing devices; and, code for causing the at least carrier-grade telecommunications network to selectively provide best-efforts grade communications prior to the class of service change request, and carrier-grade communications after the class of service change request.

14. The computer program product of claim 11, wherein the code further comprises:

code for receiving a quality of service change request from at least one of the cooperating peer computing devices; and, code for causing the at least carrier-grade telecommunications network to selectively provide best-efforts communications after the class of service change request, and carrier-grade communications prior the class of service change request.

15. The computer program product of claim 11, wherein the data indicative of at least a portion of the collected charging information communicated to the billing system associated with the at least carrier-grade telecommunications network is associated with a service broker model.

\* \* \* \* \*